US007787913B2

(12) United States Patent
Cornell

(10) Patent No.: US 7,787,913 B2
(45) Date of Patent: Aug. 31, 2010

(54) WIRELESS HEADSET COMMUNICATION SYSTEM FOR AIRCRAFT AND METHOD THEREFOR

(75) Inventor: Bradley D. Cornell, Lake Stevens, WA (US)

(73) Assignee: The Boeing Company, Seattle, WA (US)

( * ) Notice: Subject to any disclaimer, the term of this patent is extended or adjusted under 35 U.S.C. 154(b) by 185 days.

(21) Appl. No.: 11/423,912

(22) Filed: Jun. 13, 2006

(65) Prior Publication Data

US 2007/0287447 A1 Dec. 13, 2007

(51) Int. Cl.
*H04M 1/00* (2006.01)
(52) U.S. Cl. ............ 455/575.2; 455/73; 455/431; 381/74; 381/370
(58) Field of Classification Search ......... 455/100, 455/431, 569.1, 556.1, 557, 575.2, 41.2, 455/73–74; 381/74, 362, 367, 370, 376
See application file for complete search history.

(56) References Cited

U.S. PATENT DOCUMENTS

| 4,903,298 A * | 2/1990 | Cline ............... 380/270 |
|---|---|---|
| 5,983,100 A * | 11/1999 | Johansson et al. ......... 455/426.1 |
| 5,991,645 A * | 11/1999 | Yuen et al. ............. 455/575.2 |
| 2003/0045235 A1* | 3/2003 | Mooney et al. .............. 455/41 |
| 2003/0054784 A1* | 3/2003 | Conklin et al. .......... 455/151.2 |
| 2003/0100274 A1* | 5/2003 | Brown ....................... 455/90 |
| 2005/0136977 A1* | 6/2005 | Levy .......................... 455/557 |
| 2005/0260953 A1* | 11/2005 | Lefler et al. ............... 455/100 |
| 2006/0073787 A1* | 4/2006 | Lair et al. ................. 455/41.1 |
| 2006/0262949 A1* | 11/2006 | Cho et al. .................. 381/309 |
| 2007/0214583 A1* | 9/2007 | Hutton ....................... 14/71.5 |
| 2007/0243909 A1* | 10/2007 | Huang ..................... 455/569.1 |
| 2008/0057857 A1* | 3/2008 | Smith ....................... 455/3.05 |

\* cited by examiner

*Primary Examiner*—CongVan Tran
(74) *Attorney, Agent, or Firm*—Weiss & Moy, P.C.

(57) ABSTRACT

A system for converting an existing aircraft communication system to a wireless communication system has a wireless headset for transmitting and receiving communication signals. At least one aircraft transceiver having a connector to plug the transceiver to a headphone jack in the existing aircraft communication system is provided. The transceiver sends communication signals from the existing aircraft communication system and wirelessly transmits the communication signals to the transceiver and wirelessly receives communications signals from the wireless headset.

13 Claims, 2 Drawing Sheets

WIRELESS HEADSET COMMUNICATION SYSTEM FOR AIRCRAFT AND METHOD THEREFOR

BACKGROUND OF THE INVENTION

1. Field of the Invention

The present invention relates generally to aircraft communication systems, and more particularly, to a wireless headset communication system for an aircraft.

2. Background Information

Communications between the various crewmembers aboard an aircraft is typically accomplished by means of interconnected electronic devices. The aircraft communication system is a vital part of the equipment required for safe, efficient and coordinated flight crew operations. Pilots communicate with air traffic control to assure mutual understanding of assigned and intended flight paths. Pilots and co-pilots communicate over the aircraft communication system on matters related to control and flight procedures, coordinating accomplishment of checklists, switch settings and the like.

All communication systems on aircraft are designed and operate in the following manner. Specifically there are several two-way communications systems (VHF and HF radios, Satellite radios, flight, cabin, and ground interphone systems) available to the flight crew. Each crew member can select what communication system or systems they want to listen to and which communication system they want to talk on. Each flight crew member is connected to the aircraft communications systems using a corded headset. Once connected, a crew member's headset hears any audio intelligence as selected by that crew member. Should the crewmember desire to communicate as well, he or she merely engages their microphone for the selected system by pressing their Push-to-Talk (PTT) switch.

While the current aircraft communication system does work, there are several problems associated with using corded headsets. First, the crew is restricted by the wired headset to a short distance of movement about the seated position in the aircraft. Second, the wire connecting the headset to the aircraft causes operational inconvenience and can cause flight crew distraction during critical flight phases. Wired headsets have been implicated as a contributing factor in several aircraft incidents. Also a wired headset design limits the flight crew's ability to communicate with each other when one crew member is out of their crew seat or not plugged into the aircraft. Most modern commercial jet transport aircraft only have two flight crew members. When one crew member leaves the flight deck to use the restroom they cannot communicate. A wireless headset system would greatly increase safety by enabling flight crew to stay in communication when one crew member is not in the flight deck. Furthermore, the cord between the aircraft and crew is susceptible to damage. However, using longer cords can adversely affect emergency egress and increase the probability of cord damage and cord entanglement. Further, longer cords may have issues with signal integrity as longer cords may have signal degradation issues.

Therefore, it would be desirable to provide a system and method that overcomes the problems associated with the prior art. The system and method will provide a wireless headset communication system for an aircraft.

SUMMARY OF THE INVENTION

A system for converting an existing aircraft communication system to a wireless communication system has a wireless headset for transmitting and receiving communication signals. At least one aircraft transceiver having a connector to plug the aircraft transceiver to a headphone jack in the existing aircraft communication system is provided. The aircraft transceiver wirelessly transmits and receives communication signals from the existing aircraft communication system as selected by each flight crew. The headset transceiver wirelessly transmits and receives communications signals from the aircraft transceiver.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
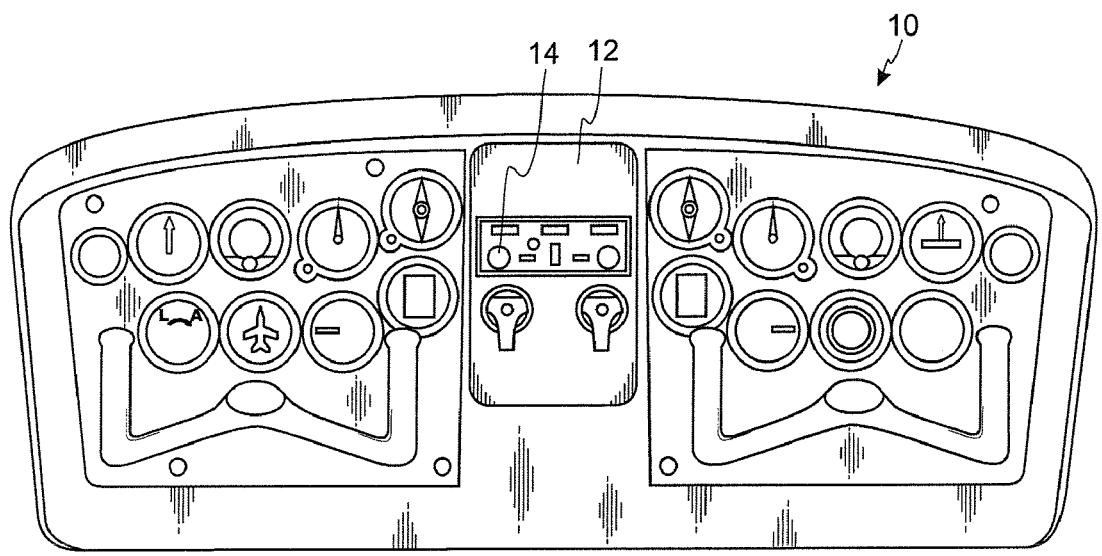
FIG. 1 is a is a simplified diagram of an aircraft cockpit control panel.

Referring to FIG. 1, a control panel 10 located within a cockpit of an aircraft is shown. The aircraft control panel 10 will have a communication board 12 located thereon. The communication board 12 is part of a communication system for the aircraft. The communication board 12 will allow communication between the pilot and co-pilot, or any flight personnel in the cockpit with another who may be coupled to the communication system on the aircraft. The communication board 12 will have one or more headset jacks 14. The headset jacks 14 are used to plug in a wired headset to the communication system of the aircraft. Other headset jacks 14 may be located throughout the aircraft.

As stated above, the wired headset creates several issues. First, the crew is restricted by the wired headset to a short distance of movement about the aircraft. Second, the wire connecting the headset to the aircraft causes operational inconvenience and can cause flight crew distraction during critical flight phases. Wired headsets also limit the flight crew's ability to communicate with each other when one crew member is out of their crew seat or not plugged into the aircraft. Furthermore, the cord between the aircraft and crew is susceptible to damage when stretched to a maximum length. However, using longer cords can interfere with emergency egress and increase the probability of entanglement and may have issues with signal integrity as longer cords may have signal degradation issues.

Figure 2:
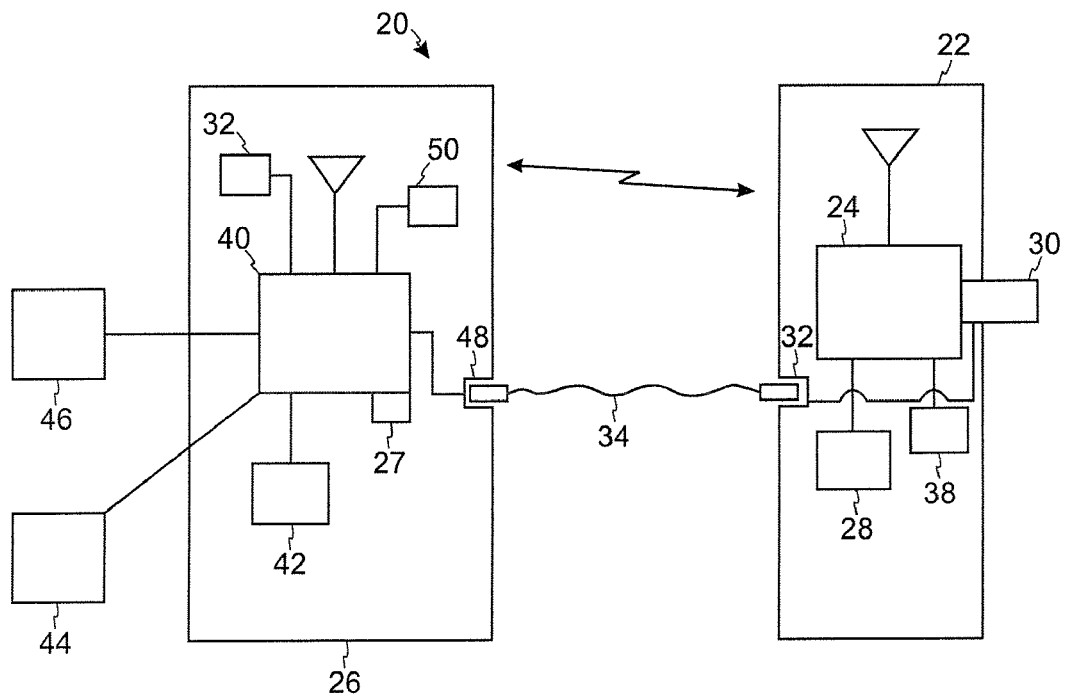
FIG. 2 is a simplified block diagram of the wireless headset communication system of the present invention.
Figure 3:
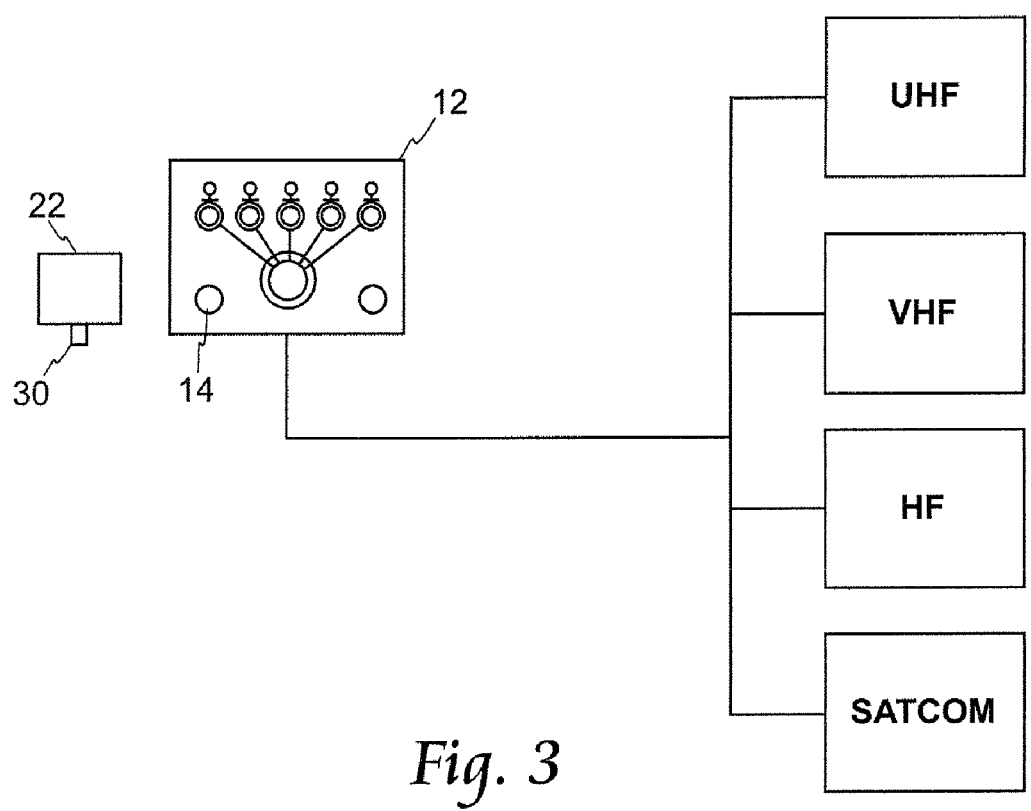
FIG. 3 is a simplified block diagram of the wireless transceiver.

Referring to FIGS. 2 and 3, a simplified block diagram of the wireless headset communication system 20 of the present invention is shown. The wireless headset communication system 20 will be coupled to the existing communication system on the aircraft. The wireless headset communication system 20 will allow wireless transmission of signals to and from a wireless headset transceiver 26. The wireless headset communication system 20 will allow the flight crew to securely communicate with the existing aircraft communication system without the inconvenience of a wire connecting the headset to the airplane. In addition the wireless headset communication system 20 will allow flight crew communications when crew members are not sitting in flight deck seats or in the flight deck itself. Most modern commercial jet transport aircraft only have two flight crew members. When one crew member leaves the flight deck to use the restroom they cannot communicate. The wireless headset communication system 20 would greatly increase safety by enabling flight crew to stay in communication when one crew member is not in the flight deck.

The wireless headset communication system 20 has two main components: a wireless aircraft transceiver 22 and a wireless headset transceiver 26. The wireless aircraft transceiver 22 will have a transmitter/receiver circuit 24. The aircraft transmitter/receiver circuit 24 is used to transmit and receive signals to and from a wireless headset transceiver 26. The circuitry of the transmitter/receiver circuit 24 may use any type of wireless technology. For example, the transmitter/receiver circuit 24 may use IEEE 802.11 Wi-Fi, Bluetooth, UWB, proprietary protocols, and the like. The listing of the above wireless technologies is given as an example and should not be used to limit the scope of the present invention. In order to have secure communications, an encryption/decryption circuit 28 may be coupled to the transmitter/receiver circuit 24. The encryption/decryption circuit 28 will ensure that unauthorized parties can not hear/receive the signals being transmitted to and from wireless aircraft transceiver 22 and the wireless headset transceiver 26.

The wireless aircraft transceiver 22 will have a plug 30 coupled to the transmitter/receiver circuit 24. The plug 30 allows the wireless transceiver 22 to be placed into an existing headset jack 14 on the communication board 12 or other headset jacks 14 located throughout the aircraft. Each existing headset jack 14 located on the aircraft generally is coupled to a power supply in order to power the prior art wired headsets. Thus, the power supplied to each headset jack 14 is used to power the wireless aircraft transceiver 22.

Each wireless aircraft transceiver 22 will have a jack 32. The jack 32 is used to plug one end of a wire 34 into the wireless transceiver 22. The other end of the wire 34 is coupled to the wireless headset transceiver 26. The wire 34 is used to charge the wireless headset transceiver 26 via the wireless aircraft transceiver 22 either in flight or on while the aircraft is on the ground. The wire 34 is also used to allow the crew to physically connect the wireless headset transceiver 26 to the aircraft bypassing the wireless aircraft transceiver 22 while bypassing the transmitter/receiver circuit 24. Alternatively, the wire 34 may be directly coupled to the aircraft via the existing headset jack 14 in the event the wireless transceiver 22 is physically damaged or not working.

The wireless aircraft transceiver 22 will have a back-up power supply 38. The back-up power supply 38 is used to power the wireless aircraft transceiver 22 should there be an interruption of power to the wireless aircraft transceiver 22 from the aircraft. The back-up power supply 38 could also be used to charge the wireless headset transceiver 26 via the wireless aircraft transceiver 22.

Figure 4:
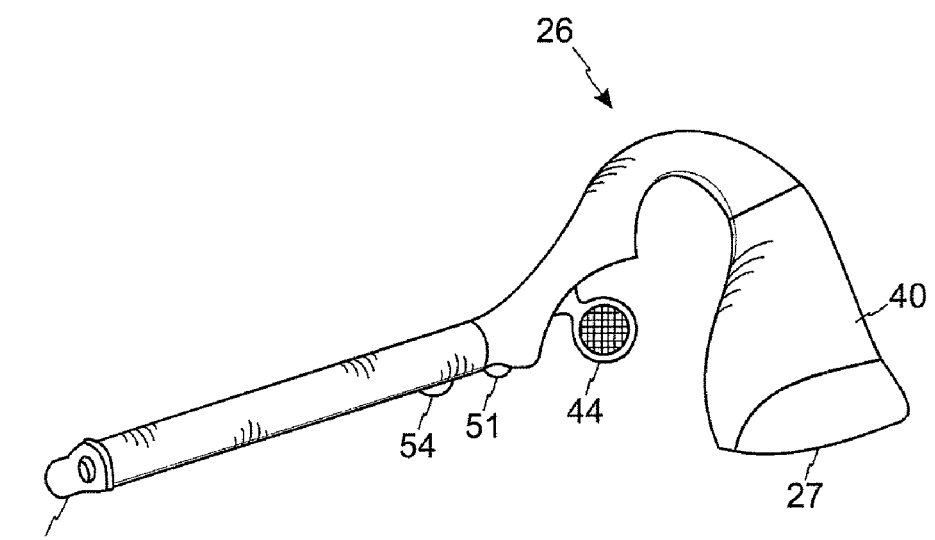
FIG. 4 is a front view of the wireless headset used in the present invention.

Referring to FIGS. 2 and 4, the wireless headset communication system 20 has a wireless headset transceiver 26. The wireless headset transceiver 26 will transmit and receive signals to and from the wireless aircraft transceiver 22. The wireless headset transceiver 26 has a power supply 27. The power supply 27 is used power the different components of the wireless headset 26.

A wireless headset transmitter/receiver circuit 40 is coupled to the power supply 27. The wireless headset transmitter/receiver circuit 40 is used to transmit and receive signals to and from the wireless aircraft transceiver 22. The circuitry of the wireless headset transmitter/receiver circuit 40 may use any type of wireless technology. For example, the wireless headset transmitter/receiver circuit 40 may use IEEE 802.11 Wi-Fi, Bluetooth, UWB, proprietary protocols, and the like. The listing of the above wireless technologies is given as an example and should not be used to limit the scope of the present invention. In order to have secure communications, a wireless headset encryption/decryption circuit 42 may be coupled to the transmitter/receiver circuit 40. The wireless headset encryption/decryption circuit 42 will ensure that unauthorized parties can not hear/receive or transmit/talk signals being transmitted to and from wireless aircraft transceiver 22 and the wireless headset 26.

The wireless headset 24 will have one or more earphones 44 coupled to the wireless headset transmitter/receiver circuit 40. The earphones 44 will allow crew members to hear the signals being transmitted from the wireless transceiver 22. A microphone 46 is also coupled to the wireless headset transmitter/receiver circuit 40. The microphone 46 will convert the sound waves into an electrical signal to be transmitted by the wireless headset transmitter/receiver circuit 40.

The wireless headset 24 will have a jack 48. The jack 48 is used to plug one end of the wire 34 into the wireless headset 24. The other end of the wire 34 is coupled to the wireless transceiver 22. The jack 48 will allow one to charge the wireless headset 26 via the wireless transceiver 22 either in flight or on while the aircraft is on the ground. The jack 48 will further allow the crew to physically connect the wireless headset 26 to the aircraft via the wireless transceiver 22 while bypassing the transmitter/receiver circuit 24. Alternatively, the jack 48 will allow the wire 34 to be directly coupled to the aircraft via the existing headset jack 14 in the event the wireless transceiver 22 is not working.

The wireless headset 26 will have a loss of signal indicator circuit 50 coupled to the wireless headset transmitter/receiver circuit 40. The loss of signal indicator circuit 50 will alert the crew that the wireless headset 26 is not communicating with the wireless transceiver 22 so action can be taken to correct the problem. The signal indicator circuit 50 may provide a visual warning, an audible warning, or both. Thus, the signal indicator circuit 48 may have a flashing light 51 to indicate a loss of signal, an audible warning may be heard in the earphones 44 to indicate a loss of signal, or the like. It should be noted that other means may be used to indicate a loss of signal without departing from the spirit and scope of the present invention.

The wireless headset 24 has a low battery indicator 52. The low battery indicator 52 will indicate when the power supply 27 in the wireless headset 24 is running low so crew action can be taken in a timely manner. The low battery indicator 52 may provide a visual warning, an audible warning, or both. Thus, the low battery indicator 50 may have a flashing light 54 to indicate low power, an audible warning may be heard in the earphones 44 to indicate low power, or the like. It should be noted that other means may be used to indicate low power without departing from the spirit and scope of the present invention.

The wireless headset communication system 20 enables flight crew to communicate with one another even though crew members may not be seat. Thus, the crew is not restricted to a short distance of movement about the aircraft by the prior art wired headsets. This increases safety and security of crew communications and aircraft operations. The wireless headset communication system 20 has the ability to communicate directly with other wireless headsets 24 thus enabling crew-to-crew communication in the event the wireless aircraft transceiver 22 was not working or the interphone selection was deselected bypassing the aircraft audio system selections.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A system for converting an existing aircraft communication system to a wireless communication system comprising:
    a wireless headset for transmitting and receiving communication signals;
    at least one aircraft transceiver having a connector to attach the aircraft transceiver to a headphone jack in the existing aircraft communication system, the aircraft transceiver wirelessly transmitting and receiving the communication signals to and from the wireless headset;
    an encryption/decryption circuit for encrypting and decrypting the communication signals; and
    a wire having a first end coupled to the aircraft transceiver and a second end coupled to the wireless headset to at least one of charge the wireless headset or provide fail safe communication with the existing aircraft communication system.

2. An aircraft communication system in accordance with claim 1 wherein the wire is directly coupled to the wireless headset and the existing headphone jack in an aircraft to provide fail safe communication.

3. A system for converting an existing aircraft communication system to a wireless communication system in accordance with claim 1 wherein the at least one aircraft transceiver comprises:
    an aircraft transceiver transmitter/receiver circuit for wirelessly sending and receiving communication signals;
    a back-up power supply coupled to the aircraft transceiver transmitter /receiver circuit; and
    wherein the encryption/decryption circuit comprises an aircraft transceiver encryption/decryption unit coupled to the aircraft transceiver transmitter/receiver circuit.

4. A system for converting an existing aircraft communication system to a wireless communication system in accordance with claim 1 wherein the wireless headset comprises:
    a headset transmitter/receiver circuit for wirelessly sending and receiving communication signals;
    at least one earpiece coupled to the headset transmitter/receiver circuit;
    a microphone coupled to the headset transmitter/receiver circuit; and
    a headset back-up power supply coupled to the transmitter/receiver circuit;
    wherein the encryption/decryption circuit comprises a headset encryption/decryption unit coupled to the headset transmitter/receiver circuit.

5. A system for converting an existing aircraft communication system to a wireless communication system in accordance with claim 1 wherein the encryption/decryption circuit comprises:
    an aircraft transceiver encryption/decryption unit located in the aircraft transceiver; and
    a headset encryption/decryption unit located in the wireless headset.

6. A system for converting an existing aircraft communication system to a wireless communication system in accordance with claim 4 wherein the wireless headset further comprises a loss of signal indicator circuit coupled to the headset transmitter/receiver circuit to indicate when the wireless headset is not communicating with the wireless transceiver.

7. A system for converting an existing aircraft communication system to a wireless communication system in accordance with claim 4 wherein the wireless headset further comprises a low battery indicator circuit coupled to the headset transmitter/receiver circuit.

8. An aircraft communication system comprising:
    a transceiver having a connector to plug the transceiver to a headphone jack in an existing aircraft communication system, communication signals being wirelessly transmitted to and from the transceiver; and
    a wireless headset for transmitting and receiving communication signals to and from the transceiver;
    wherein the transceiver and wireless headset each has an encryption/decryption circuit to prevent unauthorized access of the communication signals;
    a wire having a first end coupled to the aircraft transceiver and a second end coupled to the wireless headset to at least one of charge the wireless headset or provide fail safe communication with the existing aircraft communication system, wherein the first end may be directly coupled to the existing aircraft communication system to provide fail safe communication with the existing aircraft communication system.

9. An aircraft communication system in accordance with claim 8 wherein the transceiver comprises:
    a transceiver transmitter/receiver circuit for wirelessly sending and receiving communication signals; and
    a back-up power supply coupled to the transmitter /receiver circuit;
    wherein the encryption/decryption circuit of the transceiver is coupled to the transceiver transmitter/receiver circuit.

10. An aircraft communication system in accordance with claim 8 wherein the wherein the wireless headset comprises:
    a headset transmitter/receiver circuit for wirelessly sending and receiving communication signals;
    at least one earpiece coupled to the headset transmitter/receiver circuit;
    a microphone coupled to the headset transmitter/receiver circuit; and
    a headset back-up power supply coupled to the transmitter/receiver circuit;
    wherein the encryption/decryption circuit of the wireless headset is coupled to the headset transmitter/receiver circuit.

11. A system for converting an existing aircraft communication system to a wireless communication system in accordance with claim 10 wherein the wireless headset further comprises a loss of signal indicator circuit coupled to the headset transmitter/receiver circuit to indicate when the wireless headset is not communicating with the wireless transceiver.

12. A system for converting an existing aircraft communication system to a wireless communication system in accordance with claim 10 wherein the wireless headset further comprises a low battery indicator circuit coupled to the headset transmitter/receiver circuit.

13. An aircraft communication system comprising:
    a transceiver having a connector to plug the transceiver to a headphone jack in an existing aircraft communication system, communication signals being wirelessly transmitted to and from the transceiver, wherein the transceiver comprises:
  a transceiver transmitter/receiver circuit for wirelessly sending and receiving communication signals;
  a transceiver encryption/decryption circuit coupled to the transceiver transmitter/receiver circuit;
  a back-up power supply coupled to the transceiver transmitter /receiver circuit; and
  a transceiver jack;
a wireless headset for transmitting and receiving communication signals to and from the transceiver, wherein the wherein the wireless headset comprises:
  a headset transmitter/receiver circuit for wirelessly sending and receiving communication signals;
  a headset encryption/decryption circuit coupled to the transceiver transmitter/receiver circuit;
  at least one earpiece coupled to the headset transmitter/receiver circuit;
  a microphone coupled to the headset transmitter/receiver circuit;
  a headset back-up power supply coupled to the transmitter /receiver circuit;
  a loss of signal indicator circuit coupled to the headset transmitter/receiver circuit to indicate when the wireless headset is not communicating with the wireless transceiver;
  a low battery indicator circuit coupled to the headset transmitter/receiver circuit; and
  a wireless headset jack coupled to the headset transmitter/receiver circuit; and
a wire having a first end coupled to the transceiver and a second end coupled to the wireless headset to charge the wireless headset and provide fail safe communication, wherein the wire can having a first end coupled to the wireless headset and a second end coupled to the headphone jack to provide fail safe communication.

* * * * *